C. H. SCHURR.
MACHINE FOR GENERATING GEAR TEETH.
APPLICATION FILED JUNE 21, 1917.
1,323,382.
Patented Dec. 2, 1919.
3 SHEETS—SHEET 1.
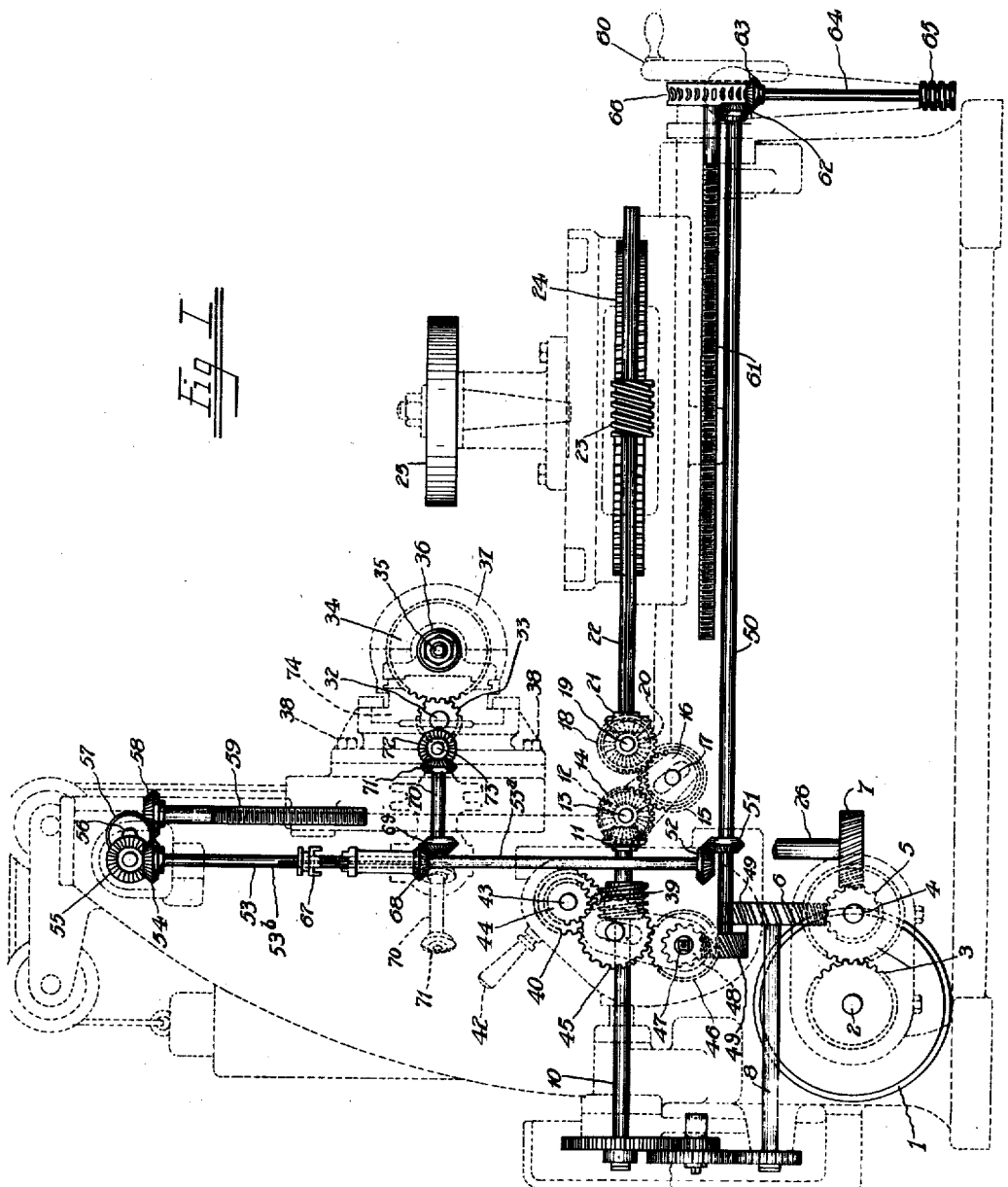
Fig. I
Inventor
Charles H. Schurr
by his Atty

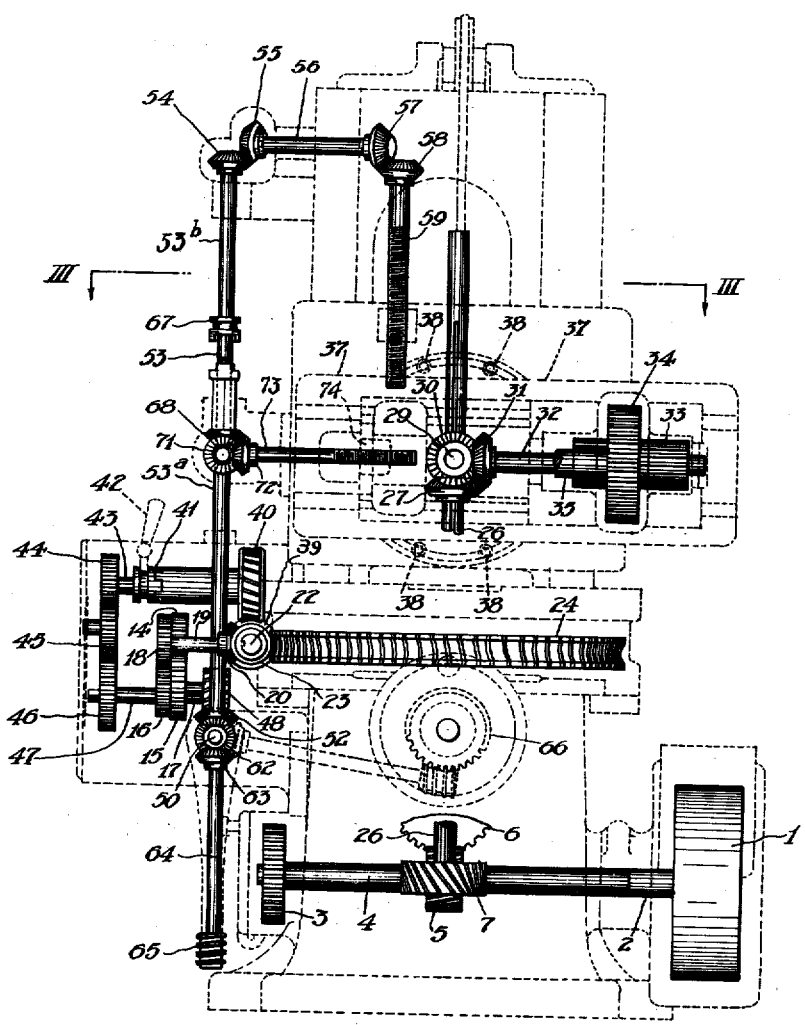

C. H. SCHURR.
MACHINE FOR GENERATING GEAR TEETH.
APPLICATION FILED JUNE 21, 1917.
1,323,382.
Patented Dec. 2, 1919.
3 SHEETS—SHEET 3.
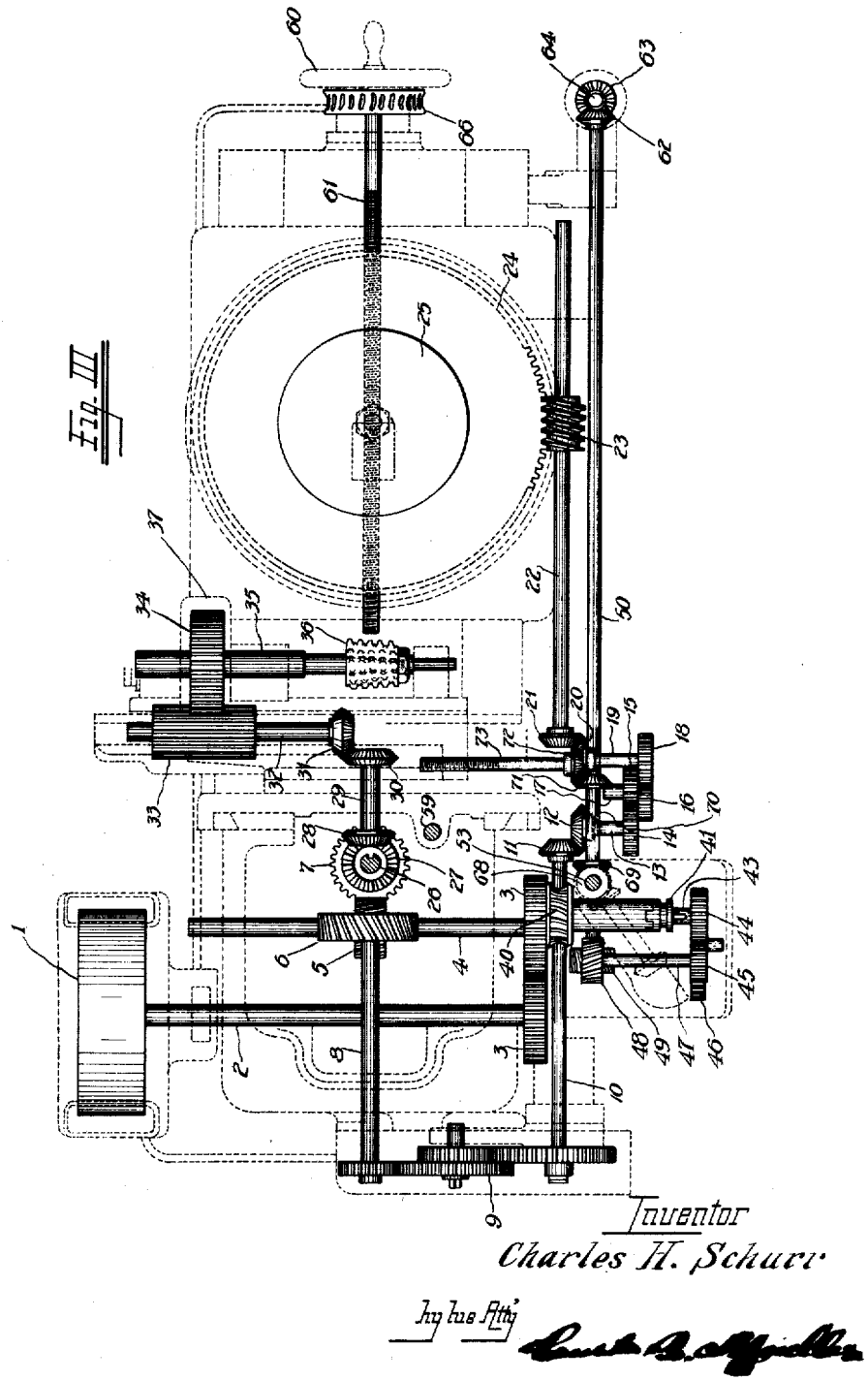
Fig. III.
Inventor
Charles H. Schurr
by his Atty

UNITED STATES PATENT OFFICE.

CHARLES H. SCHURR, OF CLEVELAND, OHIO, ASSIGNOR TO HOSEA T. BRADNER, OF CLEVELAND, OHIO.

MACHINE FOR GENERATING GEAR-TEETH.

1,323,382.   Specification of Letters Patent.   Patented Dec. 2, 1919.

Application filed June 21, 1917. Serial No. 176,165.

*To all whom it may concern:*

Be it known that I, CHARLES H. SCHURR, a citizen of the United States, residing at 6210 Carnegie Ave., city of Cleveland, in the county of Cuyahoga and State of Ohio, have invented a new and useful Improvement in Machines for Generating Gear-Teeth, of which the following is a specification, the principle of the invention being herein explained and the best mode in which I have contemplated applying that principle, so as to distinguish it from other inventions.

My present invention relates to a machine for generating the teeth either of helical gear wheels or of worm wheels preferably using a helical cutter known as a hob. This application is a continuation of my earlier copending application Serial No. 142,426 as to all matter common to the two applications. More particularly the invention perfects and also simplifies the formula required to chart the various ratios of movement so that a resultant aggregate difference between the number of revolutions made by the hob and the number made by the blank, while the relative advance of the cutter and blank covers a predetermined distance along the axis of one of the parts, may be accomplished automatically.

Such difference is composed of a repetition of some predetermined measure which is either an increment or a decrement, but amounts to the equivalent of one revolution (plus or minus) and is the fundamental characteristic which has to be reckoned with because it distinguishes the generation of helical gears and worm wheels from that of spur gears. According to my chosen exemplification, the automatic machine operation relied upon to lessen the factors to be figured is accomplished by separating a chain of compensating lead gears from the indexing gears which latter are connected between the cutter and an indexing worm and worm wheel. Such lead gears are adapted to accumulate the required rotary increment or decrement by effecting one more or one less revolution of the gear blank. The relative location of such lead gears with respect to the indexing change gears and the feed change gears is optional. My invention involves the discovery of an advantage to be derived lessening computations. In consonance therewith it is decidedly preferable to connect the feed change gears between the indexing gears and the lead gears because if the order is reversed a part of the formula, namely the feed factor, must be corrected to suit.

Accordingly, the two-fold object of my invention is to make possible the manufacture of correct helical and worm wheel gears and to simplify the calculations for any given job. Besides attaining complete instead of approximate accuracy, my machine solves complex fractions in a mechanical manner and does so automatically by separating part of the formula heretofore followed.

I let the spur constant equal the lead divided by the feed and reckon the helical constant as the lead divided by the feed plus or minus one.

Adverting to the drawings:

Figure I is a side elevation of a gear generator partly dotted embodying my invention and adapted to alternative use.

Fig. II is an end elevation of the same with certain parts absent to bring others into better view.

Fig. III is a section of line III III of Fig. II.

The novel feature of the machine consists in separating the lead change gears from the indexing change gears and besides taking the feed off in between so that while the feed change gears and lead change gears are relatively dependent they may be varied independently of the indexing change gears. In consequence the advantage is had of lessening the factoring required and leaving the feed unaffected by the lead change gearing. The common familiarity of those skilled in the art will permit brevity without impairing clearness in the description of such portions of the machine as are not peculiar to this invention. Therefore, such portions will be tersely described.

Power is, but need not necessarily be, taken from a single source, here, the pulley 1. This pulley transmits rotation to the shaft 2, thence through a set of gears 3 and along another shaft 4 to the helical gear 5 which engages with two helical gears 6 and 7, the gear 6 leading to the indexing mechanism and the gear 7 to the cutter drive. The gear 6 is mounted on shaft 8 and transmits rotary motion through the four index change gears collectively designated as 9. The upper of these indexing gears is secured to a shaft which is divided in order to accommodate the insertion of the lead gears whereby one object of my invention is achieved. Such division creates what I term a feed shaft 10 and a lead shaft to be presently described. These lead gears include a miter pinion 11, miter gear 12 mounted on a short shaft 13, spur pinion 14 at the other end of such shaft, and spur gear 15 mounted together with a pinion 16 on a common bushing which is rotatable on a pin 17. The pinion 16 drives a gear 18 on the short shaft 19 and on the opposite end of the latter is a miter pinion 20 engaging a miter gear 21 keyed to a spline shaft 22 which carries a worm 23. This shaft 22 should be considered to be the lead shaft. This worm 23 drives a worm gear 24 which is integrally connected with the work slide that supports the arbor or work spindle on which the gear blank 25 is mounted.

The helical gear 7 seen in Figs. I and II, is mounted on a vertical spline shaft 26 on which a miter pinion 27 is slidable to drive miter gear 28 supported on a short shaft 29 which is visible in Fig. III. The other end of such shaft 29 mounts a miter pinion 30 adapted to drive the miter gear 31 which is on a shaft 32 that also carries a long spur pinion 33 from whence the rotation is communicated to a spur gear 34 fixed to the cutter spindle 35. The hob 36 is mounted on the spindle 35 and the whole is suitably attached to a swiveling head 37 adapted to be fixed by bolts 38.

The shaft 10 constitutes the rotating part from which the feed is taken off and may be considered as the point of inception of the feed motion or where the divaricating feed has its origin so as to fulfil the scheme of this invention. The shaft 10 carries a worm 39 (see Fig. I) which drives a worm gear 40 and the latter drives, through a clutch 41 controlled by a lever 42, another spline shaft 43. A gear 44 rotates with the spline shaft 43 to drive an idler 45 which in turn drives a gear 46 mounted on a shaft 47. The other end of the shaft 47 has on it a helical pinion 48 which drives a helical gear 49 that is mounted on a long shaft 50. Intermediately of its ends the shaft 50 carries a bevel pinion 51 meshing with a bevel gear 52 on a vertical and divided spline shaft having a lower portion 53ª. When it is desired to cut helical gear teeth a clutch 67 is thrown in so that shafts 53ª and 53ᵇ may rotate as a unit. At the upper end of the portion 53ᵇ is a miter pinion 54 and this, as may be seen in Fig. II, engages miter gear 55 on a shaft 56. At its opposite end the shaft 56 has a miter pinion 57 which engages a miter gear 58 on a screw 59 passing through a tapped hole in the head 37 so as to enable it to raise or lower the head, so as to effect the feed in a direction parallel to the axis of the blank. When the work is to be moved up to the hob, a hand wheel 60 is manipulated which actuates the long screw 61 and hence the work slide through which it passes.

Heretofore, two methods have been practised in generating worm wheels.

According to one a harmonious compound or correlated movement was effected as between blank and tool so that the work was automatically traversed by machine power communication in order gradually to bring the centers of the engaging parts together. In short, the blank was automatically fed perpendicularly to the axis of the cutter until the proper depth of cut was obtained. To this end the shaft 50 carries a bevel pinion 62 which drives the gear 63 on a shaft 64 having fixed thereon the worm 65. The shaft 64 would be swung up into the position shown in Fig. II so as to effect engagement with a worm gear 66 which is mounted on the screw 61. Such procedure does not however avoid so called "flats" that is, a series of narrow curved cuts of different radius in minute stepped relation.

According to the other, the axis of the blank assumed a fixed or what is known as full depth position while being given increment or decrement rotary movement of predetermined correlation and depending upon the established selection of compensating lead gears. In the meantime the tool was being fed along its own axis and through the blank. The accumulation of rotary increment or decrement accomplishes a closer merging of the successive cuts by minimizing the width of the "flats" and therefore smoothing the tooth face.

To recapitulate, when it is desired to cut worm wheels according to the generating scheme which it has been preferred to have exemplified by this application, it becomes necessary to alter the direction of the feed. The drawings illustrate the feed effected by imparting a traverse movement to the cutter.

In cutting helical gear teeth the feed is required to be parallel to the axis of the blank, whereas in cutting worm wheels with a fixed relation between the axes of the blank and tool and with a feed movement in a direction parallel to the axis of the cutter, a correlation of rotary movement by means of compensating lead gears is required. In the latter instance the clutch 67 is thrown out and the power from the shaft 53 transmitted from a bevel pinion 68 which is secured thereto. This pinion 68 meshes with a bevel gear 69 on one end of a shaft 70 which is mounted on a swinging bracket, which latter is to be moved into the dotted position shown in Fig. I when the clutch 67 is thrown in or engaged preparatory to cutting helical gears. The other end of the shaft 70 likewise carries a pinion 71 which is adapted to mesh with a gear 72 upon the end of a feed screw 73 which is in screw threaded connection with a cross slide 74, upon which the cutter head 37 is movably carried as seen in Figs. II and III. In this manner the cutter which is shown as a tapered hob may be automatically fed in the direction of its own axis.

It should be understood that the design of this machine in respect to the location of certain gears, is deliberately so made as to afford a clearer disclosure of the essential mechanisms and quite without regard to commercial feasibility.

My invention as already stated uses mechanism which will allow charts or diagrams of change gear wheels of those factors common to all helical gears, whereby such factors can be excluded from the formula since taken care of or compensated for automatically. It also comprehends the expedient of adding or subtracting the number one, from a consequent instead of from an antecedent of a particular ratio. Such mechanism is separated from the indexing change gearing and placed either between the work spindle or the tool spindle as the case may be and the point (feed spindle) where the feed is first taken off, so that the feed is not altered thereby. Three terms can be known and charted, namely, (1) the number of teeth (2) the immediate numerical sequence and (3) the feed.

*Helical gears.*

Let
 NT=number of teeth in gear to be cut.
 32=CM=indexing constant in machine.
 L=lead of helix of gear.
 F=feed per revolution of gear blank.
 $\frac{1}{8}$=FC=feed constant in machine.

The formula for indexing gears is as follows:

$$\frac{NT}{CM} = \text{indexing gears}$$

Formula for the compensating lead gears is as follows:

$$\frac{(L \div F)}{[(L \div F) + 1]} = \text{lead gears.}$$

Formula for feed gears is as follows:

$$F \div FC \text{ or } \frac{F}{FC} = \text{feed gears}$$

*Example for helical gears.*

30 teeth
10 pitch
Angle with axis 34° 56′
Tangent of angle .69847
Pitch diameter 3.660″
Lead 16.462″

Formula for indexing change gears:

$$\frac{NT}{CM} = \frac{30}{32} = \text{indexing change gears.}$$

Formula for finding lead.

$$\frac{\text{Pitch diameter} \times 3.1416}{\text{tangent of angle}} = \frac{3.660 \times 3.1416}{.69847} = 16.462 = \text{lead}$$

Formula for lead gearing, the feed F being assumed as .035, is:

$$\frac{(L \div F)}{[(L \div F) + 1]} = \frac{(16.462 \div .035)}{[(16.462 \div .035) + 1]} = \frac{470}{470 + 1} = \frac{470}{471} = \frac{50 \times 94}{30 \times 157} = \text{lead change gears}$$

Formula for feed gearing would be:

$$F \div FC = \frac{35}{1000} \div \frac{1}{8} = \frac{280}{1000}$$

which factored into feed change gears, gives $$\frac{30 \times 70}{75 \times 100} = \text{feed change gears}$$

The above formulas are based on the relation between the hob, work spindle, feed shaft 10 and lead screw. They are correct when using a single thread hob of the same hand as the gear to be cut. When using an opposite hand hob to that of gear to be cut, plus 1 in the lead formula becomes minus 1.

*Worm wheels.*

Following is the data and formula for indexing gearing when hobbing worm wheels with a taper hob and feeding or traversing the hob at right angles to the axis of the worm wheel.

Let
- NT = number of teeth in gear to be cut.
- 32 = CM = indexing constant in machine.
- PD = pitch diameter.
- PC = pitch circumference.
- F = feed per revolution of gear blank.
- $\frac{1}{8}$ = FC = feed constant in machine.

Formula for feed gears when feeding tool along its own axis is $$\frac{F}{FC} = \text{feed change gears}$$

*Example for worm wheels.*

30 teeth
Pitch diameter 5.23618″
Pitch circumference 16.450″

Then formula for indexing gears is as follows:—

$$\frac{NT}{CM} = \text{indexing gears.}$$

Formula for compensating gears is as follows:

$$\frac{(PC \div F)}{[(PC \div F) + 1]} \text{ or } \frac{[(PD \times \pi) \div F]}{\{[(PD \times \pi) \div F] + 1\}} = \text{compensating change gears}$$

Feed "F" per revolution of gear blank being assumed as .035.

The formula for indexing change gears is:

$$\frac{NT}{CM} = \frac{30}{32} = \text{indexing change gears.}$$

Formula for the compensating or lead gears is as follows:

$$\frac{(PC \div F)}{[(PC \div F) + 1]} \text{ or } \frac{[(PD \times \pi) \div F]}{\{[(PD \times \pi) \div F] + 1\}} = \text{compensating change gears}$$

$$\frac{[(5.23618 \times 3.1416) \div .035]}{\{[(5.23618 \times 3.1416) \div .035] + 1\}} = \frac{(16.450 \div .035)}{[(16.450 \div .035) + 1]} = \frac{470}{(470 + 1)} = \frac{470}{471}$$

which factored into change gears is $$\frac{50 \times 94}{30 \times 157}$$

Formula for feed gearing is $$\frac{F}{FC} = \frac{.035}{\frac{1}{8}} = \frac{280}{1000}$$

which factored into feed change gears is $$\frac{30 \times 70}{75 \times 100}$$

A chart or table will be presumed to be available, of such a character as the portion now furnished:

| | Number of teeth. | Index gears. | Constants. | Lead gears. | Feed. | Feed gears. |
|---|---|---|---|---|---|---|
| | 28 | | 468 | | .0348 | |
| | 29 | | 469 | | .03485 | |
| Examples selected inclosed in dotted lines | 30 | 64—60 | 470 | 50— 94 | .0349 | |
| | 31 | | 471 | 30—157 | .03495 | |
| | 32 | | 472 | | .0350 | 30— 70 75—100 |
| | 33 | | 473 | | .0351 | |

The indexing change gears must be such as will give as many revolutions of the hob as there are teeth in the gear to be cut. The feed change gears are such as will produce a given relative feed as between the hob and the blank to be cut, parallel to the axis of the cutter or along the blank's axis for each revolution of the so-called feed shaft 10. The relative location of the lead change gears constitutes the essence of one of the two features of the present invention and they do not have the proportion of one to one. Consequently such feed shaft and that one of the spindles which is speeded up do not have the correlation of one to one. The feed change gears have no direct relation to the compensating lead change gears other than their relation to one, or, one revolution of the feed shaft to one and a fraction, plus or minus, of the particular spindle or spindles which the operator elected to speed up. The relation between the feed shaft and the hob is such as will give one revolution of the hob for each tooth in the gear to be cut. The relation of the feed shaft to the work spindle through the lead gears is expressed by the quotient of the ratio of the lead of the helix of the gear to be cut to the feed per revolution of the feed shaft, divided by the ratio of such lead to the feed, plus or minus one; or in other words according to what the drawings here exemplify the work spindle must make one complete revolution more than the feed shaft while either the blank to be cut or the hob is fed one relative to the other a predetermined distance along the axis of one of the parts.

The index change gears are obtained in accordance with the number of teeth in the gear to be cut, from a chart or diagram of index change gears, this diagram having been prepared for the various number of teeth that may be cut by means of the index change gear formula. The feed change gears are selected in accordance with the pitch, angle, and material of the blank. The lead change gears are obtained from a numerical sequence diagram or chart, the particular numerical sequence being determined by dividing the lead of the gear to be cut by the feed being employed. After the various change gear wheels are secured to their proper positions on the machine the latter is in operative condition. The essential idea which differentiates my invention from previous practice consists in separating the compensating lead change gears from the train of indexing change gears, and in then transmitting the power to the feed change gears from a point (feed shaft) in between the indexing and lead trains.

I claim:—

1. A machine for generating gear teeth comprising a tool spindle, a helical cutter mounted to rotate therewith, a work spindle, a gear blank mounted to rotate therewith, a slide supporting one of said spindles, mechanism including indexing change gears connected with one of said spindles, mechanism including feed change gears and a feed shaft connecting said indexing change gears with said slide, and mechanism including a separate train of lead change gears connecting the other of said spindles with said feed shaft, the ratio of movement between a part of said feed mechanism and said other spindle being as the number of revolutions of the first is to the number of revolutions of the second plus or minus an integral number while the slide advances a distance equal to the lead.

2. A machine for generating gear teeth comprising a tool spindle, a cutter mounted to rotate therewith, a work spindle, a gear blank mounted to rotate therewith, a slide supporting one of said spindles, mechanism for moving said slide, mechanism connected with one of said spindles and including indexing change gears and a particular rotating member, mechanism including feed change gears connecting said member with said slide moving mechanism, and mechanism including lead change gears connecting the other of said spindles with said member.

3. A machine for generating worm wheels comprising a tool spindle, a cutter mounted to rotate therewith, a work spindle, a gear blank mounted to rotate therewith, a slide supporting one of said spindles, mechanism including indexing change gears and lead change gears for correlating the rotations of said tool spindle and said work spindle, and mechanism including feed change gears operatively connected in between said first mentioned trains of gears respectively and adapted to actuate said slide parallel to the axis of the cutter.

4. A machine for generating gear teeth comprising a tool spindle, a cutter mounted to rotate therewith, a work spindle, a gear blank mounted to rotate therewith, a slide supporting one of said spindles and mechanism for correlating the rotations of said work and tool spindles and the movement of said slide including a rotating member and three distinct trains of gears each train transferring rotary motion between such rotating member and said blank, tool and slide respectively, the arrangement being such that while two trains of gears are harmoniously related for any given job the ratio of movement of the gears in one train may be calculated and determined independently of the ratio of movement of the gears of the other train.

5. A machine for generating gear teeth comprising a tool spindle, a cutter mounted to rotate therewith, a work spindle, a gear blank mounted to rotate therewith, a slide supporting one of said spindles, a rotating member, distinct power transmitting mechanisms including separated indexing, lead and feed change gears for correlating the rotation of connecting such member with the rotations of the two spindles and with the actuation of said slide respectively, such that while the feed change gears and one of the other sets of gears are interdependently correlated the ratios of all three sets of gears may be obtained from distinct tabulations.

6. A machine for generating gear teeth comprising a tool spindle, a cutter mounted to rotate therewith, a work spindle, a gear blank mounted to rotate therewith, a slide supporting one of said spindles, mechanism including indexing change gears and lead change gears for correlating the rotational movements of said tool and work spindles, and mechanism including feed change gears operatively connected in between said indexing change gears and said lead change gears and adapted to actuate said slide parallel to the axis of one of said spindles.

7. A machine for generating gear teeth, comprising a tool spindle, a work spindle, a slide supporting one of said spindles, mechanism for moving said slide, mechanism connected with one of said spindles including indexing change gears and a rotating member, mechanism including feed change gears connecting said rotating member with the slide movement mechanism and mechanism including lead change gears connecting the other of said spindles with said member.

8. A machine for generating gear teeth, as set forth in claim 7, wherein the ratio of movement between a part of the feed mechanism and the other spindle is as the number of revolutions of the first to the number of revolutions of the second, plus or minus an integral number.

9. A machine for generating worm wheels, as set forth in claim 7, wherein the mechanism for connecting the tool spindle with the work spindle includes the indexing change gears and lead change gears, and wherein the mechanism including the feed change gears is adapted to actuate the slide parallel to the axis of the tool spindle or work spindle.

10. A machine for generating gear teeth as set forth in claim 7, wherein the indexing, lead change, and feed change gears operatively connect the rotating member with the two spindles and with the slide supporting one of said spindles respectively, characterized in this, that while the feed change gears and one of the other sets of gears are interdependently correlated, the ratios of all three sets of gears may be obtained from distinct tabulation.

11. A machine for generating gear teeth, as set forth in claim 7, the arrangement being such that while two trains of gears are harmoniously related for any given job, the ratio of movement of the gears in one train may be calculated and determined independently of the ratio of the movement of the gears of the other train.

12. In a machine for generating gear teeth the combination of a frame, a tool rotatably mounted thereon, a blank rotatably mounted thereon, a slide movable upon said frame and supporting one of said engageable parts, mechanism including feed change gears and a particular rotating member and adapted to actuate said slide upon said frame, mechanism including indexing change gears for effecting a ratio of rotation of one of said engageable parts to the rotation of said member, and mechanism including lead change gears for effecting a ratio of rotation of the other of said engageable parts to the rotation of said indexing change gear mechanism.

13. A machine for generating gear teeth comprising a tool spindle, a cutter mounted to rotate therewith, a work spindle, a gear blank mounted to rotate therewith, a slide supporting one of said spindles, mechanism including indexing change gears and lead change gears for correlating the rotational movements of said tool and work spindles, and mechanism including feed change gears operatively connecting said indexing change gears and said slide and adapted to actuate said slide parallel to the axis of one of said spindles.

14. A machine for generating gear teeth, comprising a rotatable tool spindle, a rotatable work spindle, a slide supporting one of said spindles, mechanism including change gears and a rotating member for moving said slide, mechanism including change gears rotatably connecting one of said spindles to said member and adapted to transmit rotary motion from said spindle to said member and mechanism including change gears adapted to rotatably connect the other of said spindles to said member and which mechanism transmits all rotary motion between said spindle and said member.

15. In a machine for generating helical gear teeth the combination of a frame, a tool spindle, a helical tool mounted to rotate therewith, a work spindle, a blank mounted to rotate therewith, a slide movable upon said frame and supporting one of said spindles, mechanism including feed change gears and a particular rotating member and adapted to actuate said slide upon said frame, mechanism including indexing change gears for affecting a ratio of rotation of one of said spindles to the rotation of said member, said ratio being determined by the number of threads in the helical tool and the number of teeth to be cut in the blank, a single train of mechanism including lead change gears for effecting a ratio of rotation of the other of said spindles to the rotation of said member, said last mentioned ratio being either greater or less than one.

16. In a machine for generating gear teeth the combination of a frame, a tool rotatably mounted thereon, a blank rotatably mounted thereon, a slide movable upon said frame and supporting one of said engageable parts, mechanism including indexing change gears and a particular rotating member for effecting the rotation of said member by one of said engageable parts, means for driving such part, the speed of rotation of said member being predetermined so as to effect one revolution of the tool for each tooth of the blank, mechanism including feed change gears for connecting said particular rotating member and slide and adapted to actuate the latter, and mechanism including lead change gears connecting said particular rotating member with the other of said engageable parts and adapted to accumulate the required rotary increment or decrement by effecting one more or one less rotation of such last mentioned engageable part than the rotation of said member, the arrangement being such that the feed mechanism is connected with the particular rotating member and is independent of the lead mechanism.

17. In a machine for generating either spur or helical gear teeth the combination of a frame, a tool mounted to rotate thereon, a rotatably mounted blank, a slide movable upon said frame and supporting one of said engageable parts, driving means, a member rotatably mounted on said frame, mechanism connected with said driving means and including indexing change gears for rotating said member, the speed of rotation of said member being a predetermined spur constant, mechanism connected with said member for actuating said slide and including feed change gears, and mechanism including lead change gears connecting said particular rotating member with one of said engageable parts and adapted to accumulate the required rotary increment or decrement by effecting more or less rotations of such last mentioned engageable part than the rotations of said member, the arrangement being such that the feed mechanism always receives its power from the particular member which rotates as a spur constant and that therefore the feed is unaffected by the lead compensation and remains correct when the machine is employed to cut helical gears.

18. In a machine for generating gear teeth the combination of a frame, a blank rotatably mounted thereon, a slide movable upon said frame, a hob rotatably mounted upon said slide, driving means, mechanism connected with said driving means for effecting the rotation of said hob including indexing change gears and a particular rotating member, the speed of rotation of said member being a predetermined constant for generating both spur and helical gear blanks, mechanism including feed change gears and operatively connecting said particular rotating member and slide and adapted to actuate the latter, and mechanism including lead change gears and operatively connecting said particular rotating member with the other of said blank and adapted together with the indexing change gear mechanism to correlate the rotations of said blank and hob, said lead change gear mechanism being by itself purposed to accumulate the required rotary increment or decrement by effecting exactly one more or one less rotation of said blank than the rotations of said member, whereby the properly calculated feed movement is unaffected by the lead movement required for the accurate generation of helical gears.

Signed by me, this 20th day of June, 1917.

CHARLES H. SCHURR.

It is hereby certified that in Letters Patent No. 1,323,382, granted December 2, 1919, upon the application of Charles H. Schurr, of Cleveland, Ohio, for an improvement in "Machines for Generating Gear-Teeth," an error appears in the printed specification requiring correction as follows: Page 5, line 91, claim 5, strike out the word "connecting;" and that the said Letters Patent should be read with this correction therein that the same may conform to the record of the case in the Patent Office.

Signed and sealed this 3d day of February, A. D., 1920.

[SEAL.]

M. H. COULSTON,
*Acting Commissioner of Patents.*

Cl. 90—4.